US012660799B1

(12) United States Patent
Tu

(10) Patent No.: US 12,660,799 B1
(45) Date of Patent: Jun. 23, 2026

(54) ELECTRIC PET TOY

(71) Applicant: Yuelv Tu, Lianjiang (CN)

(72) Inventor: Yuelv Tu, Lianjiang (CN)

( * ) Notice: Subject to any disclaimer, the term of this patent is extended or adjusted under 35 U.S.C. 154(b) by 0 days.

(21) Appl. No.: 19/228,652

(22) Filed: Jun. 4, 2025

(51) Int. Cl.
*A01K 15/02* (2006.01)

(52) U.S. Cl.
CPC .................................. *A01K 15/025* (2013.01)

(58) Field of Classification Search
CPC .... A01K 15/025; A01K 15/027; A01K 15/02; A01K 15/021
See application file for complete search history.

(56) References Cited

U.S. PATENT DOCUMENTS

| | | | | |
|---|---|---|---|---|
| 4,803,953 | A * | 2/1989 | Graves ................. | A01K 15/025 124/16 |
| 7,631,617 | B1 * | 12/2009 | Tsengas ............... | A01K 15/025 119/707 |
| 11,266,121 | B2 * | 3/2022 | Rowe ................... | A63B 21/157 |
| 2007/0095302 | A1 * | 5/2007 | Levan ................. | A01K 15/025 119/708 |

| | | | | |
|---|---|---|---|---|
| 2008/0042000 | A1 * | 2/2008 | Horton .................... | A45F 5/004 119/796 |
| 2014/0053786 | A1 * | 2/2014 | Lee ....................... | A01K 15/025 119/707 |
| 2018/0103615 | A1 * | 4/2018 | Meade ................. | B65H 75/446 |
| 2020/0154674 | A1 * | 5/2020 | Cosey ................. | A01K 15/027 |
| 2020/0229399 | A1 * | 7/2020 | Wolfgram ............ | A01K 15/025 |
| 2020/0352135 | A1 * | 11/2020 | Reynolds .............. | B25J 9/1633 |
| 2022/0232803 | A1 * | 7/2022 | Wolfgram ............ | A01K 15/025 |
| 2025/0089678 | A1 * | 3/2025 | Cooper ................ | A01K 15/025 |

* cited by examiner

*Primary Examiner* — Joshua J Michener
*Assistant Examiner* — Nicole Paige Maccrate
(74) *Attorney, Agent, or Firm* — Nicholas Makridakis

(57) ABSTRACT

An electric pet toy is provided, which includes a main unit, a rope, and a fixing device. The main unit includes a shell, a driving motor, and a roller. The driving motor is fixed on the shell. The roller includes a center shaft and side walls that are oppositely arranged on two sides of the center shaft. The center shaft is connected to an output shaft of the driving motor. When working, the driving motor can drive the roller to rotate clockwise or counterclockwise. One end of the rope is connected to the roller, and another end is connected with an ornament. The rope can be wound on the center shaft under the rotation of the roller, to drive the ornament to do reciprocating movement in a vertical direction.

9 Claims, 8 Drawing Sheets

21'

21'

ELECTRIC PET TOY

TECHNICAL FIELD

The present disclosure belongs to the technical field of electric devices, and in particular, to an electric pet toy.

BACKGROUND

With the booming development of the pet economy, demands for intelligent and fun products in a pet supplies market continue to rise. As a traditional pet teasing tool, a hanging pet toy is highly favored by consumers thanks to its ability to simulate a dynamic state of a prey. However, there are still significant technical bottlenecks in practical applications. For the existing hanging toy, a rope is manually pulled to drive an end ornament to move. This is limited by time and energy of an operator, and it is difficult to achieve all-weather automatic pet teasing. The simple straight pulling or one-dimensional swinging motion mode of the existing hanging toy is vastly different from a complex dynamic scene that a pet faces when the pet chases a prey in a natural environment.

According to analysis from the perspective of pet behaviors, feline and canine animals have a natural hunting instinct for rapidly changing and irregularly moving objects, but repetitive and regular movement trajectories can easily lead to behavioral habituation in pets, causing the attractiveness of the toy to rapidly decrease in a short period of time. However, electric hanging toys on the current market mostly use a fixed-frequency motor or a fixed track device, which cannot simulate dynamic features of sudden acceleration, direction change, and sudden stop of a prey in the nature world, making it difficult to continuously stimulate hunting desires of pets.

SUMMARY

The present disclosure provides an electric pet toy, and aims to solve problems of a single movement trajectory, a single application scene, inability to better tease a pet, and the like of an existing pet toy.

In order to solve the above technical problems, in a first aspect, the present disclosure provides an electric pet toy, including a main unit, a rope, and a fixing device.

The main unit includes a shell, a driving motor, and a roller. The driving motor is fixed on the shell. The roller includes a center shaft and side walls that are oppositely arranged on two sides of the center shaft. The center shaft is connected to an output shaft of the driving motor. When working, the driving motor drives the roller to rotate clockwise or counterclockwise.

One end of the rope is connected to the roller, and another end is connected with an ornament. The rope is wound on the center shaft under the rotation of the roller, to drive the ornament to do reciprocating movement in a vertical direction.

One end of the fixing device is connected to the shell, and another end is detachably connected to a target object, so that when the main unit is connected to the target object, the center shaft of the roller is in a horizontal direction.

Further, the center shaft includes a shaft hole and a plurality of flanges that extend outwards from the shaft hole in a radial direction, and angles formed between the flanges are the same.

Further, four flanges are comprised, and extension lengths of at least some of the flanges are different.

Further, a bearing is fixed at a tail end of the output shaft, and a cross section of the bearing is larger than a cross section of the output shaft and is rectangular.

Further, the fixing device includes two oppositely arranged clamping arms. Each of the two clamping arms includes a fixing end and a clamping end. The two fixing ends are in shaft connection to the shell, to cause the two clamping arms to rotate around the fixing ends. Torsion springs are further arranged at the two fixing ends, to generate an elastic clamping force between the two clamping arms. The clamping ends extend to an outside of the shell to clamp the target object.

Further, the fixing ends of the two clamping arms are of gear structures. The two gear structures are meshed with each other. The two gear structures pass through axes of gears via fixing screws and are fixed to the shell.

Further, the clamping ends are connected with clamping lugs. The clamping lugs are provided with nonslip pads.

Further, the fixing device includes at least one suction cup. The suction cup is arranged in the horizontal direction or the vertical direction to be sucked to a surface of the target object in different directions.

Further, the shell further includes a baffle plate. The baffle plate is close to the roller and is arranged in a circumferential direction of outer edges of the two side walls to block an outer side of a portion of the roller.

Further, the rope is made of an elastic material.

Compared with the existing art, the electric pet toy of the present disclosure uses the driving motor to pull the ornament to move. In acceleration driving and stop processes, pulling performed by a person can be simulated. Further, the two-directional motor is used to drive the roller to rotate in two directions, thus driving the ornament to do vertical and horizontal multidirectional motion. A movement trajectory is more complex, which can better attract the attention of a pet and achieve a better teasing effect.

BRIEF DESCRIPTION OF THE DRAWINGS

For clearer descriptions of the technical solutions according to the embodiments of the present application, the drawings required to be used in the description of the embodiments are briefly introduced below. It is apparent that the drawings in the description below are some embodiments of the present application, and it is obvious for those skilled in the art that other drawings can be acquired according to the drawings without creative efforts.

Numerals in the accompanying drawings: 1: main unit; 2: fixing device; 3: rope; 4: ornament; 11: shell; 12: roller; 13: driving motor; 14: control panel; 21: clamping arm; 21': suction cup; 22: clamping end; 23: fixing end; 111: front cover; 112: rear cover; 113: baffle plate; 114: control button; 121: side wall; 122: center shaft; 131: output shaft; 132: bearing; 221: clamping lug; 222: fixing screw; and 223: torsion spring.

DETAILED DESCRIPTION OF THE EMBODIMENTS

The following will provide a clear and complete description of the technical solutions in the embodiments of the present disclosure in conjunction with the accompanying drawings of the present disclosure. It should be understood that specific implementations described herein are only for illustrating and explaining the present disclosure, and are not intended to limit the present disclosure. In the present disclosure, unless otherwise stated, directional words such as "up, down, left, right" usually mean up, down, left, and right referred to in the accompanying drawings. "Inside and outside" mean inside and outside relative to the contour of a component itself.

Figure 1:
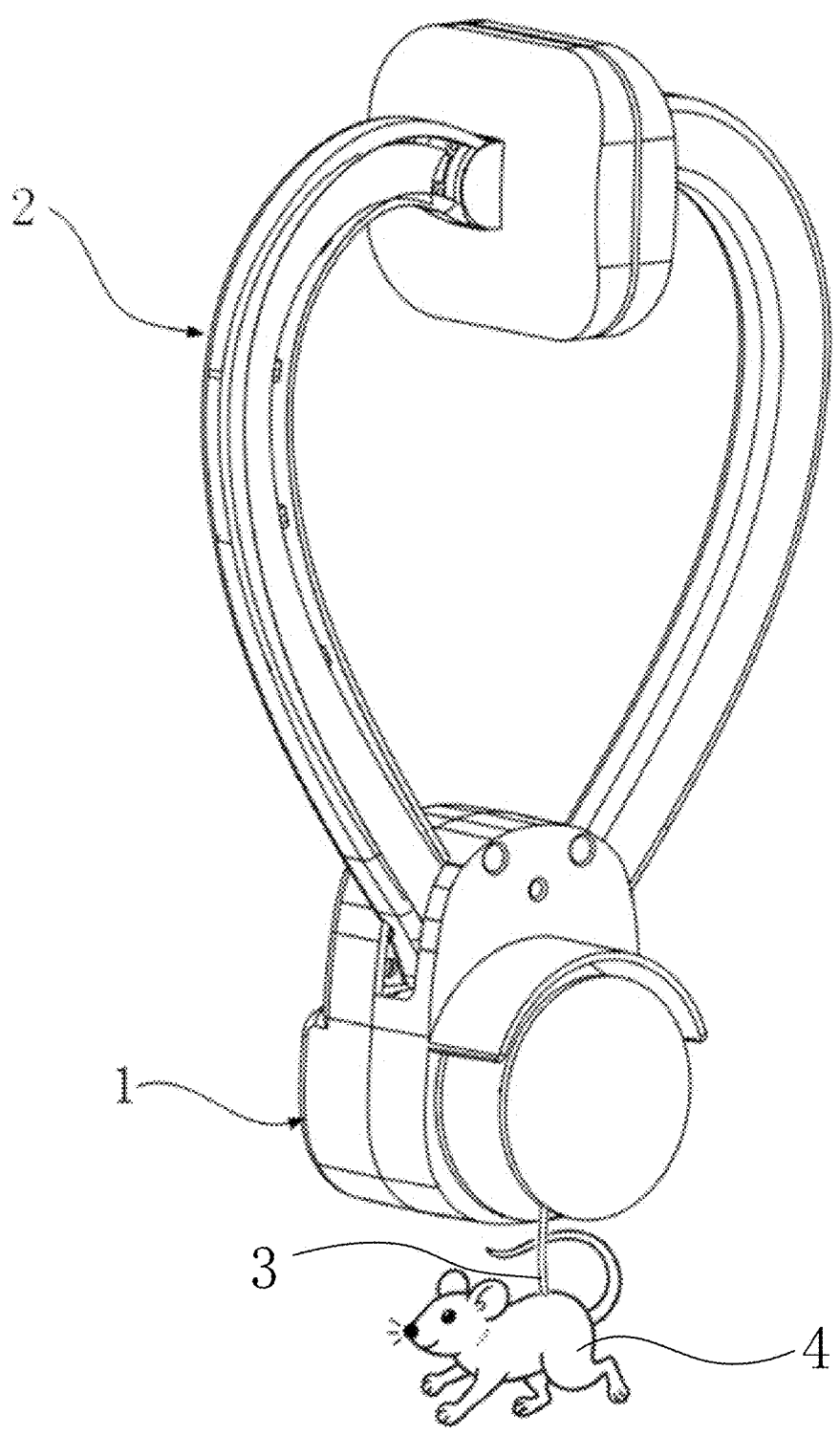
FIG. 1 is a schematic structural diagram of a front surface of an electric pet toy according to an embodiment of the present disclosure.
Figure 2:
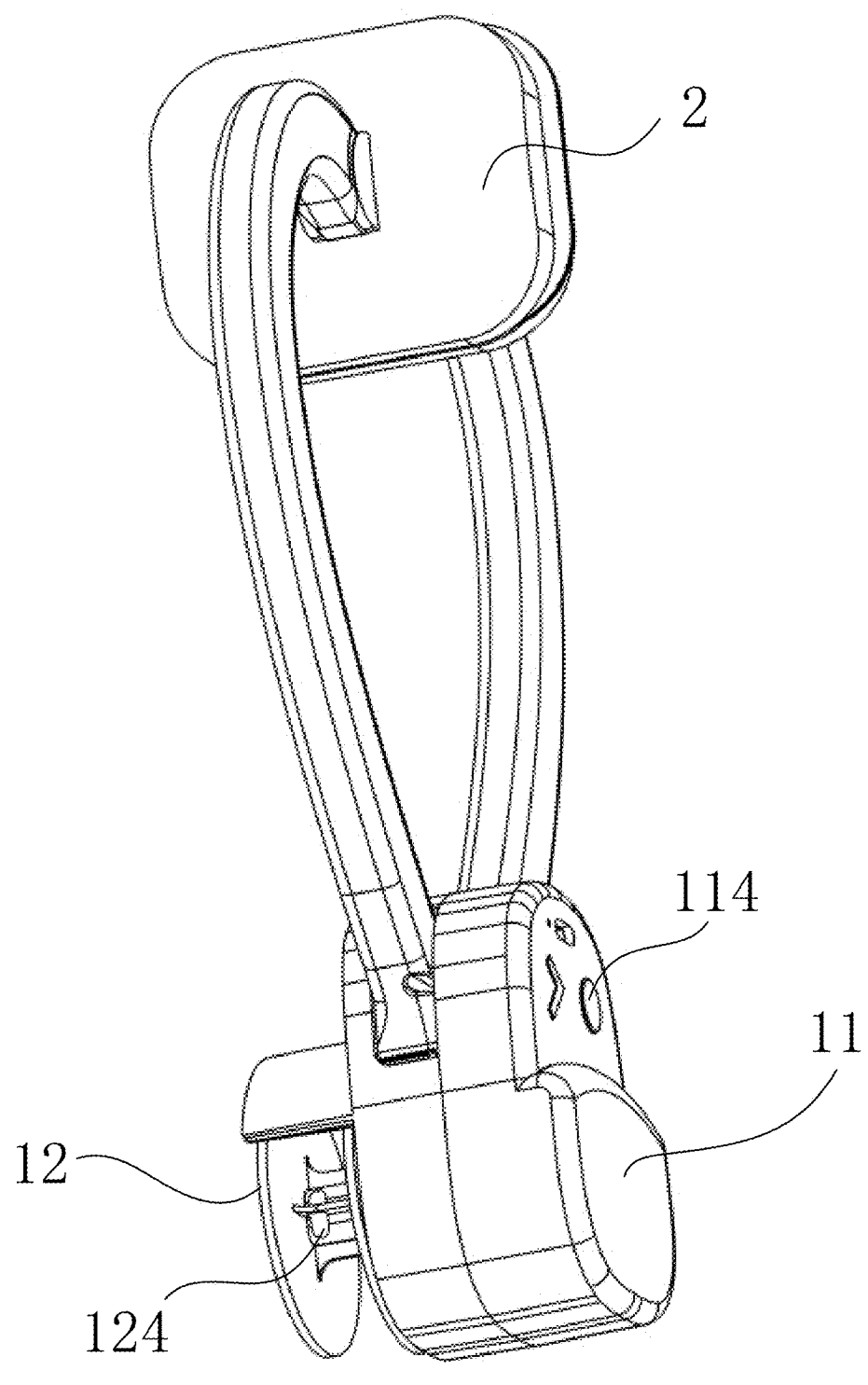
FIG. 2 is a schematic structural diagram of a back surface of the electric pet toy according to the embodiment shown in FIG. 1.
Figure 3:
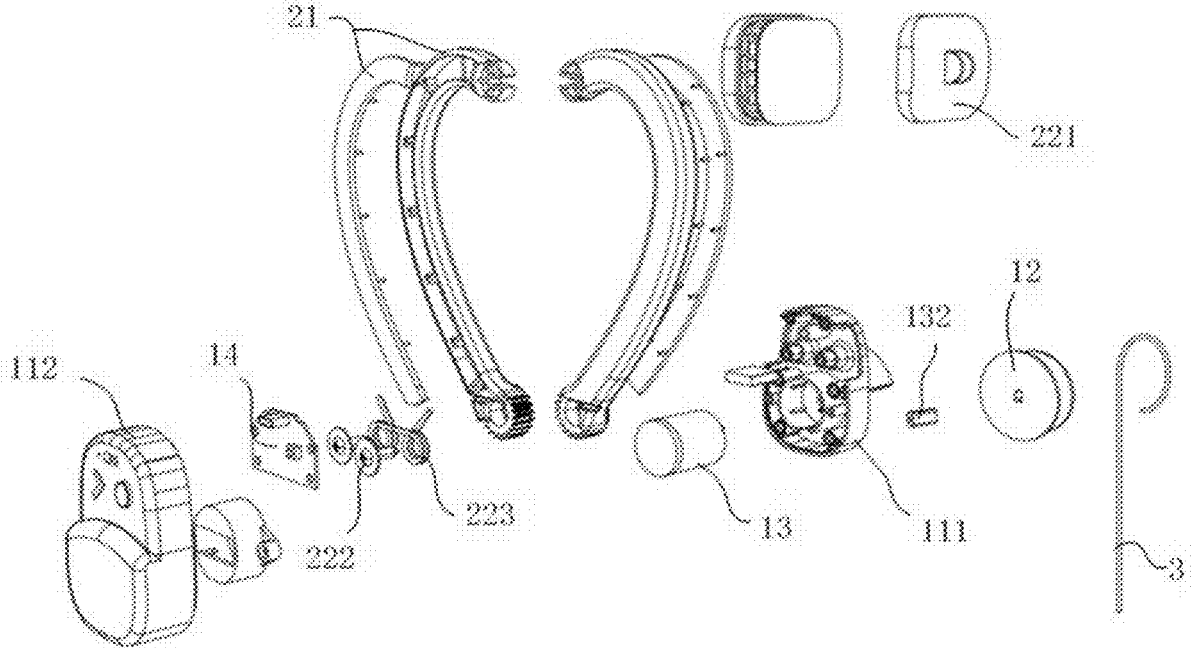
FIG. 3 is an exploded view of the electric pet toy according to the embodiment shown in FIG. 1.

Referring to FIG. 1 to FIG. 8, FIG. 1 shows an overall structure of an electric pet toy according to an embodiment of the present disclosure. As shown in FIG. 1 and FIG. 3, the electric pet toy includes a main unit 1, a rope 3, and a fixing device 2. The main unit 1 includes a shell 11, a driving motor 13, and a roller 12. The driving motor 13 is fixed on the shell 11. The roller 12 includes a center shaft 122 and side walls 121 that are oppositely arranged on two sides of the center shaft 122. The center shaft 122 is connected to an output shaft 131 of the driving motor 13. When working, the driving motor 13 can drive the roller 12 to rotate clockwise or counterclockwise. One end of the rope 3 is connected to the roller 12, and another end is connected with an ornament 4. The rope 3 can be wound on the center shaft 122 under the rotation of the roller 12, to drive the ornament 4 to do reciprocating movement in a vertical direction. One end of the fixing device 2 is connected to the shell 11, and another end is detachably connected to a target object, so that when the main unit 1 is connected to the target object, the center shaft 122 of the roller is in a horizontal direction.

Figure 4:
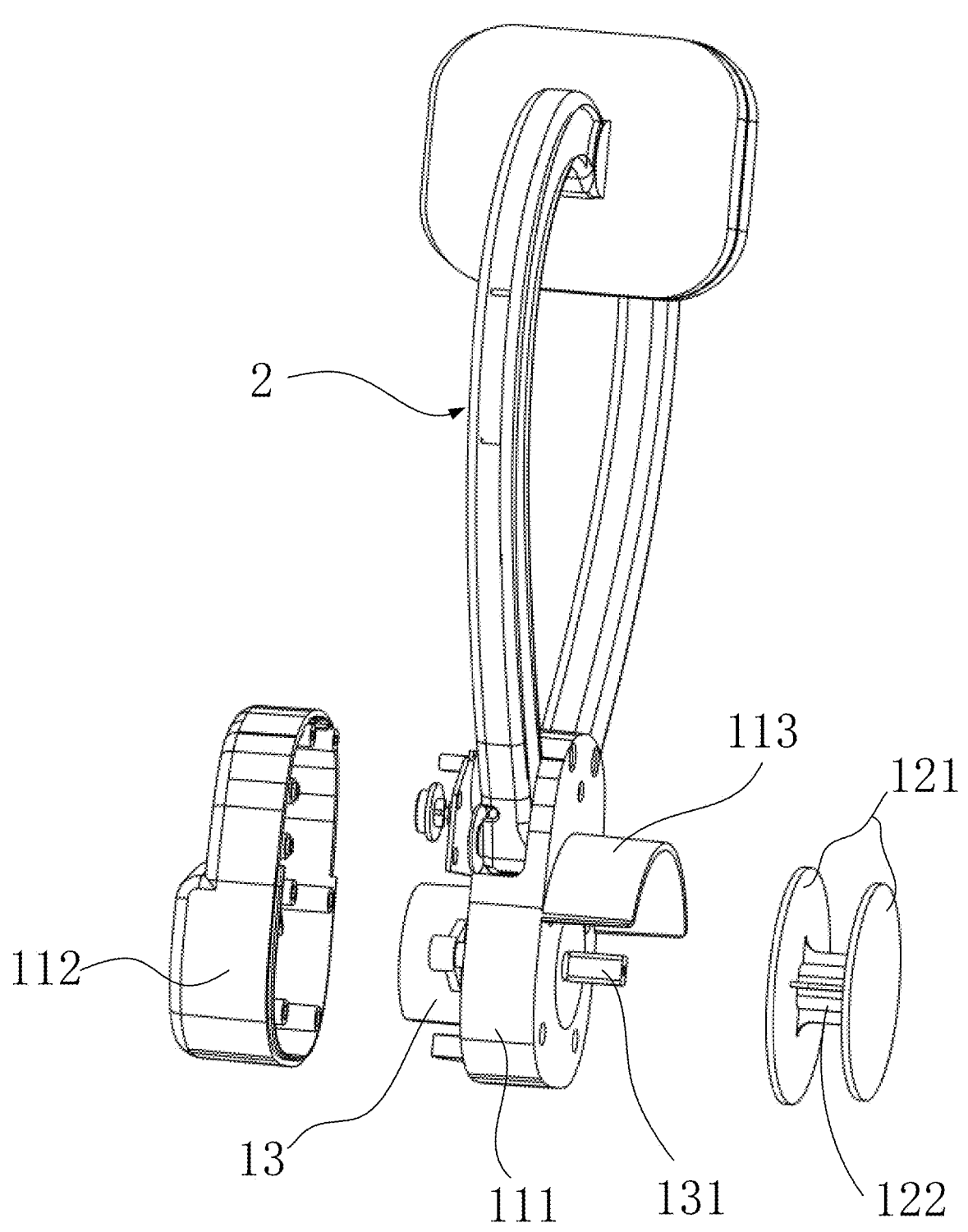
FIG. 4 is a partially exploded diagram of the electric pet toy according to the embodiment shown in FIG. 1.

In a specific embodiment, as shown in FIG. 2 to FIG. 4, the shell 11 includes a front cover 111 and a rear cover 112. The front cover 111 and the rear cover 112 are enclosed into an internal chamber. To ensure axial positioning accuracy and avoid shaking during operation, a motor slot for accommodating and fixing the driving motor 13 is defined inside the internal chamber. A portion of the driving motor 13 is mounted in a fixing slot and is further fixed in the fixing slot through a motor cover and a screw. The output shaft 131 of the driving motor 13 extends from the internal chamber to an outside of the front cover 111. The roller 12 is connected to the output shaft 131 outside the front cover 111 and maintains a gap from the front cover 111. The entire roller 12 is cylindrical, and has a center shaft 122 and two circular side walls 121 with equal sizes. The two side walls 121 are oppositely connected to two ends of the center shaft 122, and a small hole 124 is provided in the center shaft 122. One end of the rope 3 can be fixed to the center shaft 122 through the small hole 124 and is wound on the center shaft 122 when the roller 12 rotates. The two side walls 121 can restrict the rope 3 from being wound out of the center shaft 122 in a winding process. The rope 3 can pull the mouse ornament 4 at the other end to move when the rope 3 is wound. The driving motor 13 is a bidirectional motor that can drive the roller 12 to rotate clockwise or counterclockwise, and can also achieve clockwise and counterclockwise winding or unwinding of the rope 3. The rear cover 112 is further provided with a control button 114, and a control panel 14 is further mounted in the internal chamber. The control panel 14 is electrically connected to the control button 114 and the driving motor 13, to control an operating state of the driving motor 13, for example, turning on/off the driving motor or performing a corresponding operating mode. The operating mode can be clockwise or counterclockwise cyclic rotation according to set time and a set speed, and a specific operating mode can be adjusted according to different design requirements.

In a specific embodiment, as shown in FIG. 4, the shell 11 further includes a baffle plate 113. The baffle plate 113 is arranged on the front cover 111. The baffle plate 113 is close to the roller 12 and is arranged in a circumferential direction of outer edges of the two side walls 121, namely, the baffle plate 113 is arranged in a branch region on one side of the roller 12, to block an outer side of a portion of the roller 12. The rope 3 is further limited within a winding region of the roller 12, to prevent the rope 3 from being separated from a defined region of the center shaft 122 and the side walls 121 due to fast winding during winding of the rope 3.

In some embodiments, the fixing device 2 may be a detachable device such as a magnetic suction device, a suction cup 21', a clamping device, an adhesion device, or the like. It can be designed according to different usage needs.

During use, the fixing device 2 fixes the main unit 1 at a height above the ground, and the center shaft 122 of the roller is in the horizontal position, so that the rope 3 is in a state perpendicular to the ground. After the driving motor 13 is controlled to work, the roller 12 can be driven to rotate. The rotation of the roller 12 can automatically wind the rope 3. The retraction of the rope 3 drives the ornament 4 to move up and down in the vertical direction. In the process of falling and moving, the ornament 4 can also generate horizontal shaking. Therefore, by continuous forward and reverse driving of the driving motor 13, the ornament 4 can achieve both up and down movement and horizontal shaking, thereby attracting the attention of a pet and achieving a purpose of teasing the pet.

Figure 6:
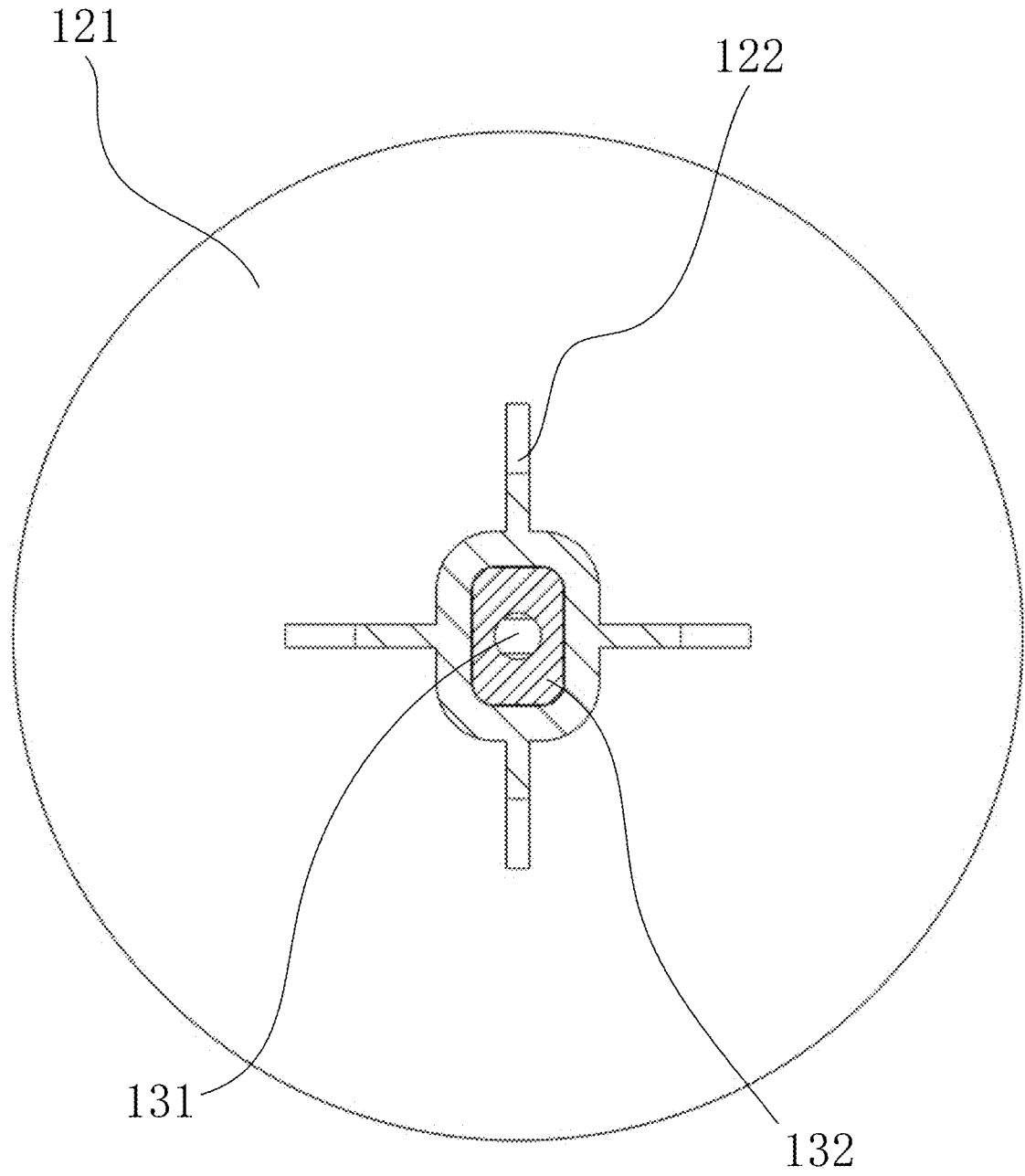
FIG. 6 is a cross-sectional diagram of a roller according to an embodiment of the present disclosure.
Figure 7:
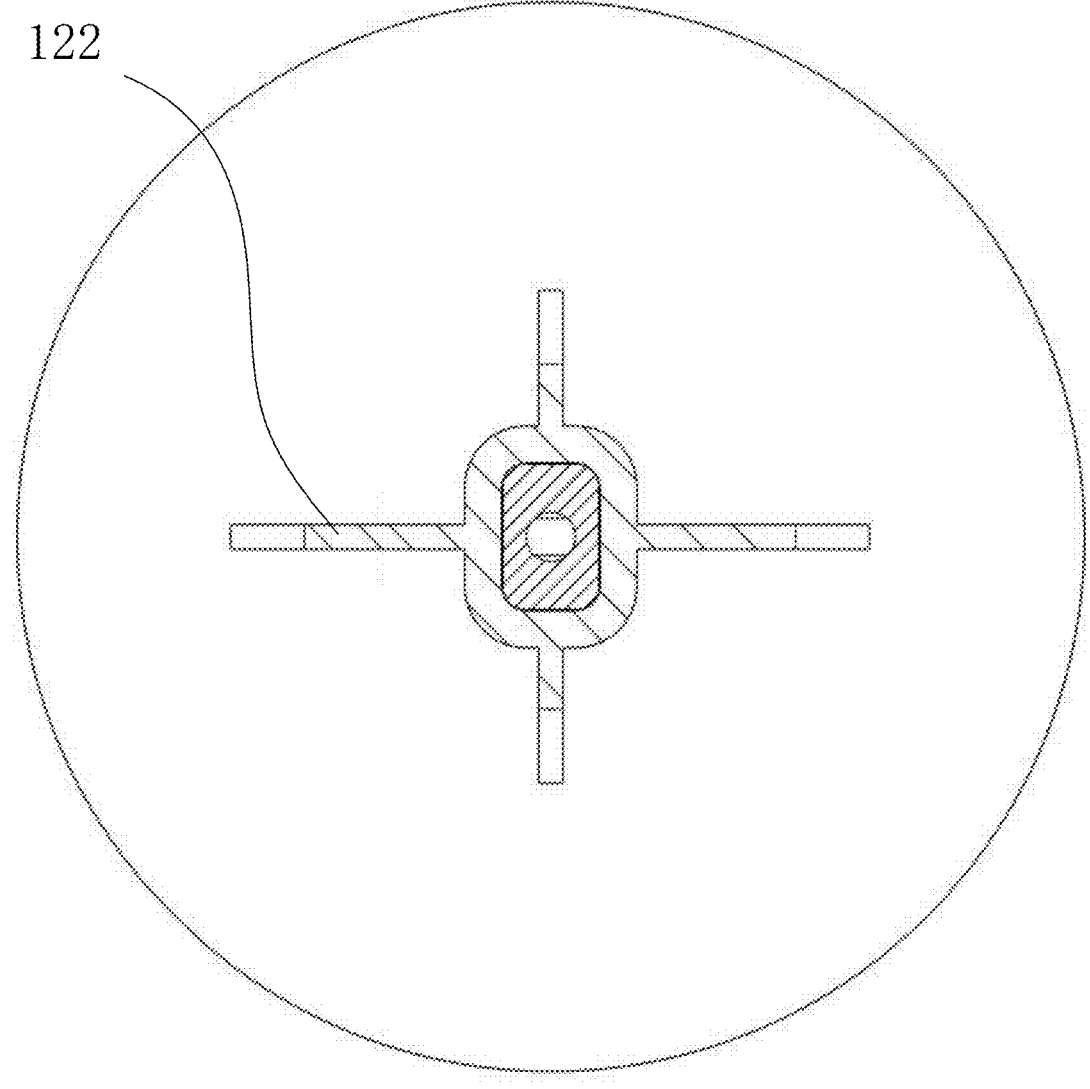
FIG. 7 is a cross-sectional diagram of a roller according to another embodiment of the present disclosure.

In an embodiment, as shown in FIG. 4 and FIG. 6, the center shaft 122 includes a shaft hole and a plurality of flanges that extend outwards from the shaft hole in a radial direction, and angles formed between the flanges are the same. The purpose of arranging the flanges is that corner angles increase the roughness and contact area of a surface of a shaft body. Compared with a circular shaft body, the flanges can significantly increase a friction between the rope and the shaft body, reduce slippage, and more efficiently convert a driving force of the motor into a lifting motion of the rope. Secondly, adding the flanges can make the force distribution on the center shaft 122 more uniform, enhance the torsional strength of the shaft body, and especially in a scene of frequent clockwise and counterclockwise rotation of the rope, lower a risk of deformation or fracture of the shaft body due to a torque. For a situation in which a plurality of ropes need to be driven simultaneously, the shaft body can fix the plurality of ropes respectively through different flanges, to achieve unique distribution of a load and avoid an excessive force on a single side surface. There may be two flanges, that is, the two flanges are arranged on the same plane, and an angle between the two flanges is 180°.

There may be three, four, or more flanges, and angles between the flanges are corresponding 120°, 90°, or the like.

Furthermore, when the roller 12 rotates, the rope is alternately in contact with different side surfaces along corner angles of a cross-shaped contour, so that the ornament 4 on the rope can further increase its horizontal deviation during vertical lifting and lowering.

In an optional embodiment, as shown in FIG. 6, there are four flanges, angles between which are 90°. Extension lengths of at least some of the flanges are different. For example, extension lengths of two oppositely arranged flanges are the same, and extension lengths of two adjacent flanges are different or extension lengths of all the flanges are different. An overall cross section is cross-shaped, and every two flanges have different lengths. By adjusting an edge length ratio of the cross-shaped shaft body, an amplitude and frequency of the horizontal deviation of the rope can be changed, thereby controlling a movement trajectory of the ornament 4, increasing a movement amplitude of the ornament, and achieving better attraction and teasing effects.

In an optional embodiment, the rope 3 is made of an elastic material. The elastic material may include rubber, silicone, or the like. The rope 3 made of a common elastic material and the technical solution that achieves the above effects shall fall within the scope of protection of this technical solution. The rope 3 made of the elastic material can be stretched by using the gravity of the ornament 4 when the ornament 4 moves vertically. After rebounding, the rope 3 can generate a relatively large irregular bouncing motion, which can better attract the attention of a pet and achieve a better teasing effect.

In an optional embodiment, as shown in FIG. 3 and FIG. 6, a bearing 132 is fixed at a tail end of the output shaft 131, and a cross section of the bearing 132 is larger than a cross section of the output shaft 131 and is rectangular. By adding the output shaft 131, surface contact locking can be formed with a clamping slot of the center shaft 122 of the roller 12. Compared with an ordinary circular shaft, this shaft can significantly improve torque transmission efficiency and avoid power loss caused by slippage. For example, in a toy transmission scene that require high-frequency clockwise and counterclockwise rotation, the rectangular shaft can ensure real-time synchronization of a driving force of the motor to the roller 12, to maintain stability of movement of the rope. In some embodiments, the output shaft 131 may also be in another shape. For example, its cross section is triangular, hexagonal, and in another irregular shape.

Figure 5:
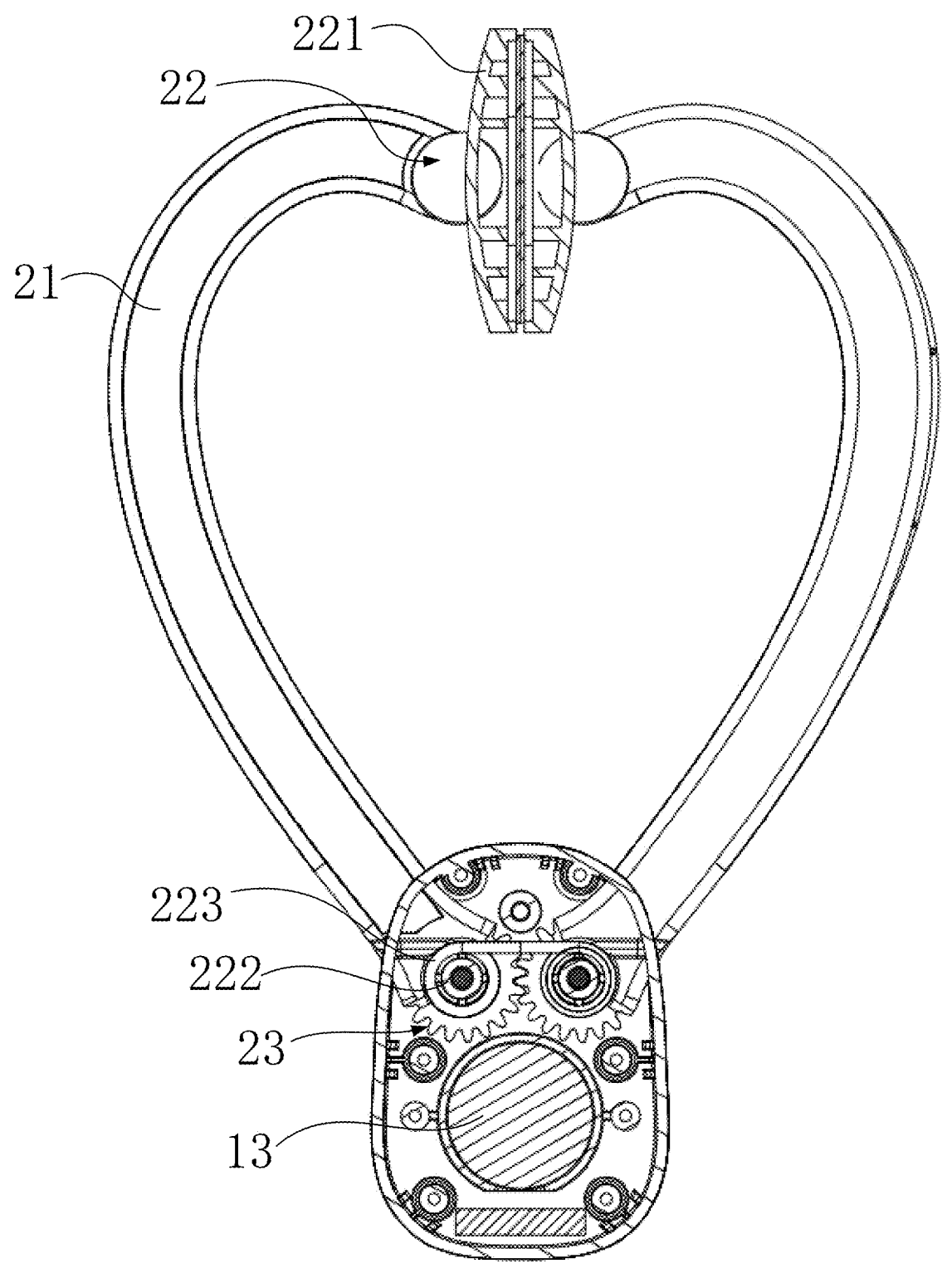
FIG. 5 is a cross-sectional diagram of the electric pet toy according to the embodiment shown in FIG. 1.

In an embodiment, as shown in FIG. 5, the fixing device 2 includes two oppositely arranged clamping arms 21. Each of the two clamping arms 21 includes a fixing end 23 and a clamping end 22. The two fixing ends 23 are in shaft connection to the shell 11, to cause the two clamping arms 21 to rotate around the fixing ends 23. Torsion springs 223 are further arranged at the two fixing ends 23, to generate an elastic clamping force between the two clamping arms 21. The clamping ends 22 extend to an outside of the shell 11 to clamp the target object.

In a specific embodiment, a half open region is defined at a top of the shell 11 to accommodate part of the clamping arms 21. That is, the fixing ends 23 of the two clamping arms 21 are connected to the shell 11 and are partially surrounded, and the other ends of the two clamping arms 21 extend upward to the outside of the shell 11, so that the clamping arms 21 clamp the target object from the bottom. The torsion springs 223 are arranged at the fixing ends 23 of the two clamping arms 21, to generate a reverse torsion force when the clamping arms 21 are opened. That is, the two clamping arms 21 have corresponding clamping forces to clamp the bottom of the target object.

For some usage scenes such as a door frame and other high positions, using a clamping device for fixing is more convenient and firmer.

In an optional embodiment, as shown in FIG. 3 and FIG. 5, the fixing ends 23 of the two clamping arms 21 are of gear structures. The two gear structures are meshed with each other. The two gear structures pass through axes of gears via fixing screws 222 and are fixed to the shell 11.

The gear structures can ensure consistency during the movements of the clamping arms 21, thereby improving reliability of the clamping arms 21, and avoiding falling during playing due to fixing tilting caused by desynchrony of opening or closing of the clamping arms 21.

In an optional embodiment, as shown in FIG. 3 and FIG. 5, the clamping ends 22 are connected with clamping lugs 221. The clamping lugs 221 are provided with nonslip pads.

The clamping lugs 221 usually have flat contact surfaces, to enlarge a clamping area and increase a friction force. Further, by adding the nonslip pads on the clamping lugs 221, the friction force is further increased to achieve a better clamping effect. The clamping lugs 221 are hinged to the clamping ends 22. There is a rotation angle for the clamping lugs 221 to facilitate the clamping lugs 221 to better fit clamping surfaces. There are no restrictions on shapes of the clamping lugs 221. A material of the nonslip pads can be a flexible material such as rubber or silicone, which ensures the friction force while preventing damage to the target object.

Figure 8:
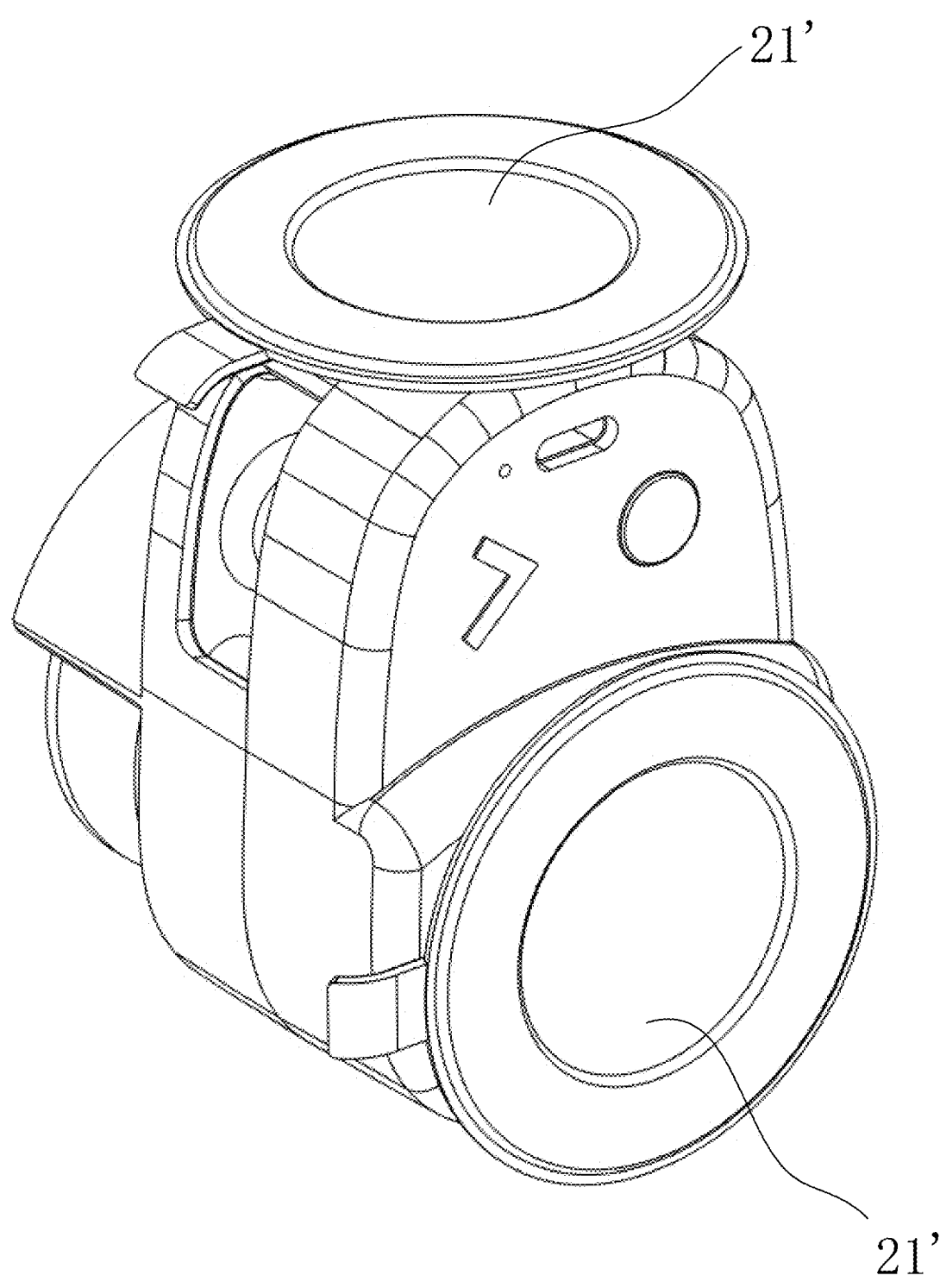
FIG. 8 is a schematic structural diagram of an electric pet toy according to another embodiment of the present disclosure.

In an optional embodiment, as shown in FIG. 8, the fixing device 2 includes at least one suction cup 21'. The suction cup 21' is arranged in the horizontal direction or the vertical direction to be sucked to a surface of the target object in different directions. Specifically, the suction cup 21' can be arranged at a top of a cover body and faces upwards or can be arranged on the rear cover 112 in the horizontal direction. The suction cup 21' is usually configured to be sucked to a smooth surface. By mounting the suction cup 21' at different positions on the shell 11, the product can be sucked to different surfaces of the target object, such as a wall surface, glass, and a ceiling Compared with the related art, the electric pet toy of the present disclosure uses the driving motor to pull the ornament to move. In acceleration driving and stop processes, pulling performed by a person can be simulated. Further, the two-directional motor is used to drive the roller to rotate in two directions, thus driving the ornament to do vertical and horizontal multidirectional motion. A movement trajectory is more complex, which can better attract the attention of a pet and achieve a better teasing effect.

In order to further complicate a movement trajectory, the rope made of the elastic material is used. Furthermore, the center shaft of the roller is set to have edges, and lengths of the edges are then adjusted. In order to further add usage scenes of the toy, the toy can be fixed at different positions by clamping or by using the suction cup, thereby improving convenience and flexibility of use of the toy.

The present disclosure is described through some embodiments. Those skilled in the art are aware that various changes or equivalent replacements can be made to these features and embodiments without departing from the spirit and scope of the present disclosure. In addition, under the guidance of the present disclosure, these features and embodiments can be modified to adapt to specific situations and materials without departing from the spirit and scope of the present disclosure. Therefore, the present disclosure is not limited by the specific embodiments disclosed herein, and all embodiments falling within the scope of the claims of the present disclosure shall fall within the scope of protection of the present disclosure.

What is claimed is:

1. An electric pet toy, comprising:
a main unit, comprising a shell, a driving motor, and a roller, wherein the driving motor is fixed on the shell; the roller comprises a center shaft and side walls that are oppositely arranged on two sides of the center shaft; the center shaft is connected to an output shaft of the driving motor; when working, the driving motor drives the roller to rotate clockwise or counterclockwise;
a rope, wherein one end of the rope is connected to the roller, and another end is connected with an ornament; the rope is wound on the center shaft under the rotation of the roller, to drive the ornament to do reciprocating movement in a vertical direction; and
a fixing device, wherein one end of the fixing device is connected to the shell, and another end is detachably connected to a target object, so that when the main unit is connected to the target object, the center shaft of the roller is in a horizontal direction;
wherein the fixing device comprises two oppositely arranged clamping arms; each of the two clamping arms comprises a fixing end and a clamping end; the two fixing ends are in shaft connection to the shell, to cause the two clamping arms to rotate around the fixing ends; torsion springs are further arranged at the two fixing ends, to generate an elastic clamping force between the two clamping arms; and the clamping ends extend to an outside of the shell to clamp the target object.

2. The electric pet toy according to claim 1, wherein the fixing ends of the two clamping arms are of gear structures; the two gear structures are meshed with each other; and the two gear structures pass through axes of gears via fixing screws and are fixed to the shell.

3. The electric pet toy according to claim 2, wherein the clamping ends are connected with clamping lugs; and the clamping lugs are provided with nonslip pads.

4. The electric pet toy according to claim 3, wherein the fixing device comprises at least one suction cup; the suction cup is arranged in the horizontal direction or the vertical direction to be sucked to a surface of the target object in different directions.

5. The electric pet toy according to claim 4, wherein the shell further comprises a baffle plate; and the baffle plate is close to the roller and is arranged in a circumferential direction of outer edges of the two side walls to block an outer side of a portion of the roller.

6. The electric pet toy according to claim 5, wherein the rope is made of an elastic material.

7. The electric pet toy according to claim 1, wherein the center shaft comprises a shaft hole and a plurality of flanges that extend outwards from the shaft hole in a radial direction, and angles formed between the flanges are the same.

8. The electric pet toy according to claim 7, wherein four flanges are comprised, and extension lengths of at least some of the flanges are different.

9. The electric pet toy according to claim 1, wherein a bearing is fixed at a tail end of the output shaft, and a cross section of the bearing is larger than a cross section of the output shaft and is rectangular.

\* \* \* \* \*